Sept. 11, 1962     H. A. McANINCH ETAL     3,053,103
TRANSMISSION
Filed Aug. 19, 1958
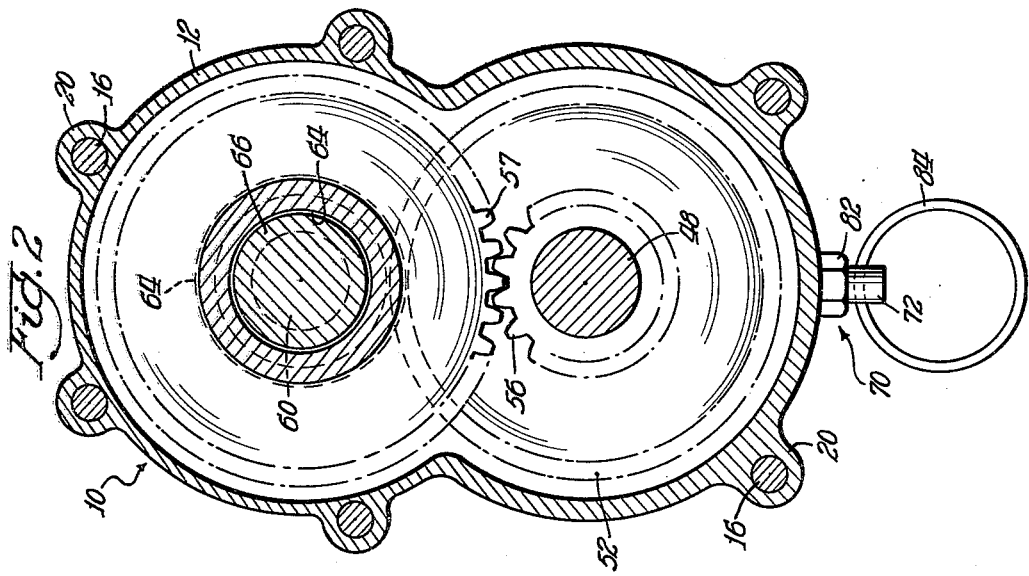
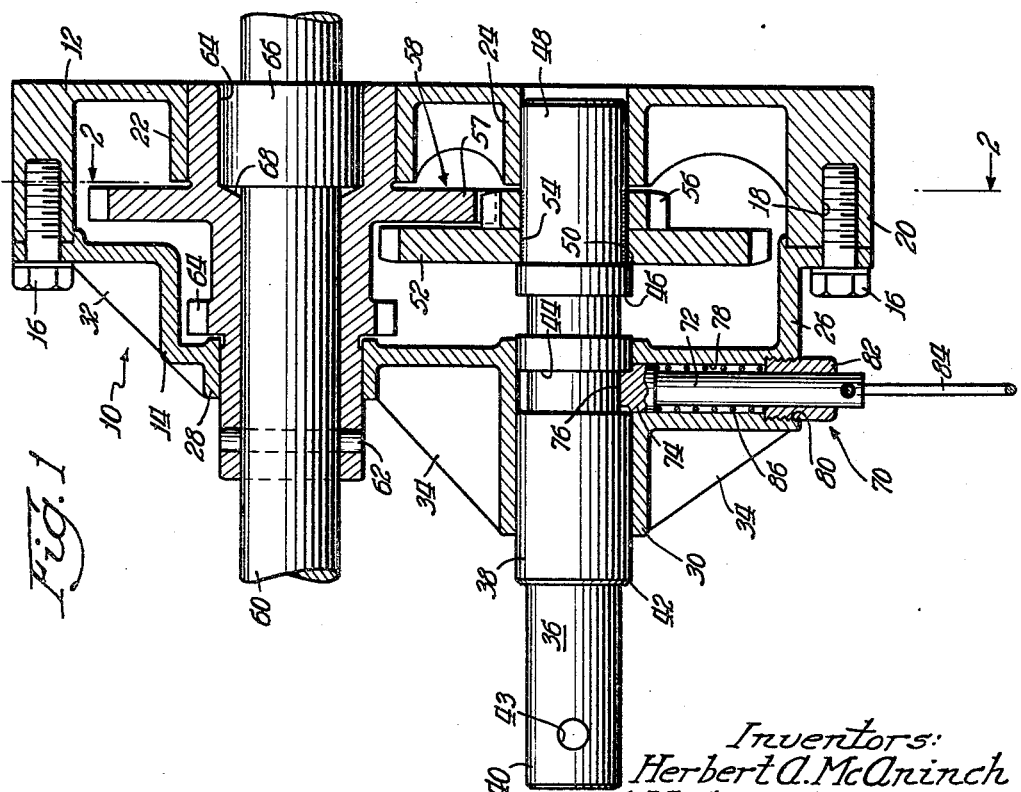
Inventors:
Herbert A. McAninch
and Verle M. Tharpe
By: Francis T. Drumm Atty.

United States Patent Office 3,053,103
Patented Sept. 11, 1962

3,053,103
TRANSMISSION
Herbert A. McAninch and Verle M. Tharpe, Auburn, Ind., assignors to Borg-Warner Corporation, Chicago, Ill., a corporation of Illinois
Filed Aug. 19, 1958, Ser. No. 755,987
3 Claims. (Cl. 74—342)

This invention relates to power transmissions and more particularly to a power transmission of the multiple speed type particularly suitable for raising or lowering the landing gear of a truck trailer.

A principal object of the invention is to provide an improved manually actuatable, multiple speed, counter shaft transmission of the stated type which is characterized by convention in form, ease and economy of manufacture and improved functional characteristics.

A further object of the invention is to provide a counter shaft transmission of the mentioned type in which the input shaft may be shifted axially to obtain a plurality of speed ratios and in which detent means are provided to lock the input shaft in one of several positions to obtain one of several speed ratios.

This invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

FIGURE 1 is an elevational sectional view of a power transmission made in accordance with the present invention; and FIGURE 2 is a vertical sectional view taken substantially on line 2—2 of FIGURE 1.

Referring to the drawing and more particularly to FIGURE 1 the transmission of the present invention is indicated generally by reference numeral 10 and comprises a base section 12 and a cover section 14, secured to the base section 12 by means of spaced cap screws 16 each of which is received in a threaded opening 18 in an axially extending ear 20. The housing 10 is adapted to be secured by any suitable means to the side of one of the pair of legs of a conventional truck trailer landing gear system (not shown).

The base section 12 is provided with integrally formed spaced parallel hollow bosses 22 and 24. The cover section 14 has an axially offset portion 26 provided with spaced parallel integrally formed bosses 28 and 30 in register respectively with the bosses 22 and 24 of the base section 12. A plurality of integrally formed webs 32 (only one of which is shown in FIGURE 1) connect the boss 28 and the offset portion 20 with the main body portion of the cover section to afford rigidity. Similarly the boss 30 is joined to the offset portion 26 by means of a plurality of integrally formed webs 34. It will be noted that the boss 30 is somewhat longer than the boss 28 for a reason which will now be described.

Slidably disposed within the boss 30 and the registering boss 24 is an input shaft 36 which has a main portion 38 of a diameter to be snugly received in the bore of the boss 30, an outer portion 40 of reduced diameter defined by a shoulder 42, axially spaced peripheral recesses 44 and 46 for a purpose hereafter described, and a reduced portion 48 at the other end dimensioned to correspond to the bore of the boss 24. The reduced portion 48 forms a shoulder 50 against which abuts a gear 52 which is of relatively large diameter and secured to the periphery of the reduced portion 48 by means of brazing or the like as at 54. Immediately adjacent the gear 52 is a gear 56 of relatively small diameter secured to the periphery of the reduced portion 48 in like manner. The input shaft 36 may be manually actuated by means of a hand crank (not shown) in which the reduced portion 40 may be received. The shoulder 42 may form a stop. If desired the crank may be secured in position by a pin received in radial opening 43.

In mesh with the gear 56, in the position of the mechanism illustrated in FIGURE 1, is a large diameter section 57 of an output gear 58 which is affixed to an output shaft 60 by any suitable means such as a pin 62. The output shaft 60, in the present instance, may form the transversely extending shaft upon which the landing gear legs of the truck trailer are affixed for pivotal movement therewith and the gear 58 is journalled in the registering bosses 28 and 22 of the cover section 14 and the base section 12 respectively. Integrally formed with the output gear 58 is a small diameter section 64 for a purpose hereafter described. A counterbore 64 is formed in one end of the gear 58 for reception of a stop collar 66 affixed to the shaft 60. To assemble the shaft 60 in operative relation to the output gear 58 the shaft may be inserted from the right, as viewed in FIGURE 1, until the collar 66 bottoms against shoulder 68 defined by a counterbore 64. The shaft 60 may then be rotated until the openings in the gear 58 and the shaft 60 are in register for reception of the pin 62.

In the position of the transmission illustrated in FIGURE 1 a mechanical advantage is obtained by the meshing of the gear 56 with the large diameter section of the output gear 58. If greater speed of the output shaft is desired the entire input shaft 36 may be shifted to the left, as viewed in FIGURE 1, so that the large diameter gear 52 is meshed with the small diameter section 64 of the gear 58 and the small diameter gear 56 is no longer in mesh with the larger diameter section 57 of the output gear 58.

According to the present invention the input shaft 36 may be maintained in one position or the other by means of a detent assembly 70 which has a plunger 72 provided with a head 74 having a reduced portion 76 which is receivable in either the recess 44 or the recess 76. The entire detent assembly 70 is receivable in a bore 78 in the offset portion 26 of the cover section 14. Communicating with the bore 70 is a threaded counterbore 80 in which is received a threaded plug 82 through which the plunger 72 passes. A ring 84 is carried by the outer end of the plunger 72 which is normally biased inwardly by a spring 86 extending between the head 74 and the plug 82. It will be appreciated that the detent assembly 70 must be released in order to shift the input shaft 36 from one position to the other. It will be noted that the reduced portion 76 of the head 74 presents a finite surface to the walls defining the recesses 44 and 46 so that slipping from either of these detent positions is precluded.

In operation, in the position illustrated in FIGURE 1, the shaft 36 may be rotated in a clockwise direction, for instance, for rotation of the shaft 60 in a counterclockwise direction at a mechanical advantage. In the event that speed is more important than power, as when lowering the landing gear into position, the ring 84 may be grasped manually and pulled downwardly, as viewed in FIGURE 1, until the reduced portion 76 of the head 74 clears the recess 44. The shaft 36 may be slided to the left, as viewed in FIGURE 1, to a position in which the reduced portion 76 of the head 74 is received in the recess 46 rather than the recess 44. In that position the large diameter gear 52 is in mesh with the small diameter gear section of the output gear 58.

Since the present device is used only intermittently, the gears and the bearing surfaces may be coated with molybdenum disulfide to preclude the need for petroleum lubricants.

While we have described our invention in connection with certain specific constructions and arrangements, it is to be understood that this is by way of illustration and not by way of limitation and the scope of our invention is defined solely by the appended claims which should be construed as broadly as the prior art will permit.

We claim:

1. A power transmission comprising a housing including a base section having integrally formed spaced parallel hollow bosses, a cover plate having spaced parallel hollow bosses in register with the bosses of said base section, fastening means for maintaining said cover plate and said base section in assembled relation, an input shaft slidably disposed in a pair of registering bosses, said shaft being formed with a pair of axially spaced circumferential grooves, a gear of relatively large diameter affixed to said input shaft, a gear of relatively small diameter affixed to said input shaft adjacent said first-named gear, an output shaft, an elongated output gear affixed to said output shaft, said output gear being journalled in a second pair of registering hollow bosses in parallelism with said input shaft, said output gear having integrally formed therewith a gear section of relatively large diameter and a gear section of relatively small diameter in axially spaced relation thereto, said input shaft being manually shiftable axially for selective engagement of said relatively small diameter gear of said input shaft with the relatively large diameter gear section of said output gear or engagement of said relatively large diameter gear of said input shaft with said relatively small diameter section of said output gear, and detent means including a plunger adapted to be received into one or the other of said pair of axially spaced circumferential grooves for locking said input shaft in one or the other of two axial positions.

2. Power transmission apparatus in accordance with claim 1 wherein said housing cover section is provided with an offset portion having integrally formed webs connecting said hollow bosses therewith.

3. A power transmission comprising a housing including a base section having integrally formed spaced parallel hollow bosses, a cover plate having spaced parallel hollow bosses in register with the bosses of said base section and an offset portion, fastening means for maintaining said cover plate and said base section in assembled relation, an input shaft slidably disposed in a pair of registering bosses, said shaft being formed with a pair of axially spaced circumferential grooves, a gear of relatively large diameter affixed to said input shaft, a gear of relatively small diameter affixed to said input shaft adjacent said first-named gear, an output shaft, an elongated output gear affixed to said output shaft, said output gear being journalled in a second pair of registering hollow bosses in parallelism with said input shaft, said output gear having integrally formed therewith a gear section of relatively large diameter and a gear section of relatively small diameter in axially spaced relation thereto, said input shaft being manually shiftable axially for selective engagement of said relatively small diameter gear of said input shaft with the relatively large diameter gear section of said output gear or engagement of said relatively large diameter gear of said input shaft with said relatively small diameter section of said output gear, and detent means for locking said input shaft in one or the other of two axial positions, said detent means including a bore formed in the offset portion of said cover section, a plunger received in said bore, said plunger having a head at the inner end thereof formed with a reduced portion, a threaded counterbore, a plug threadedly received in said counterbore, coil spring extending between said plug and said head and normally biasing said plunger inwardly, a ring carried by said plunger and adapted to be actuated manually for moving the reduced portion of said head out of one or the other of said circumferential grooves to permit sliding movement of said input shaft from one position to another.

References Cited in the file of this patent

UNITED STATES PATENTS

| | | |
|---|---|---|
| 1,384,811 | Strand | July 19, 1921 |
| 1,758,584 | Rarig | May 13, 1930 |
| 2,277,614 | Suhner | Mar. 24, 1942 |
| 2,348,145 | Perkins | May 2, 1944 |
| 2,387,713 | Bradford | Oct. 30, 1945 |
| 2,534,951 | Cargill | Dec. 19, 1950 |
| 2,587,624 | Johnson | Mar. 4, 1952 |
| 2,701,478 | Riess | Feb. 8, 1955 |

FOREIGN PATENTS

| | | |
|---|---|---|
| 711,620 | Great Britain | July 7, 1954 |